United States Patent
Khan et al.

(10) Patent No.: US 7,469,151 B2
(45) Date of Patent: Dec. 23, 2008

(54) METHODS, SYSTEMS AND COMPUTER PROGRAM PRODUCTS FOR OVER THE AIR (OTA) PROVISIONING OF SOFT CARDS ON DEVICES WITH WIRELESS COMMUNICATIONS CAPABILITIES

(75) Inventors: Mohammad Khan, San Jose, CA (US); Pradeep Kumar, Fremont, CA (US); Roshan Vijayshankar, Santa Clara, CA (US); Ming-Li Liu, Foster City, CA (US); Narendra Narayanan, Sunnyvale, CA (US)

(73) Assignee: Vivotech, Inc., Santa Clara, CA (US)

( * ) Notice: Subject to any disclaimer, the term of this patent is extended or adjusted under 35 U.S.C. 154(b) by 301 days.

(21) Appl. No.: 11/514,698

(22) Filed: Sep. 1, 2006

(65) Prior Publication Data
US 2008/0058014 A1 Mar. 6, 2008

(51) Int. Cl.
*H04B 1/38* (2006.01)
(52) U.S. Cl. .................. 455/558; 455/419; 455/406; 455/414.1
(58) Field of Classification Search ............ 455/558, 455/419, 406, 414.1, 456.1, 456.2, 556.1, 455/412.1, 407, 432.1; 713/182, 156; 705/71, 705/75; 235/380
See application file for complete search history.

(56) References Cited

U.S. PATENT DOCUMENTS

2005/0070257 A1    3/2005  Saarinen et al.
2006/0165060 A1    7/2006  Dua
2006/0236325 A1   10/2006  Rao et al.
2007/0042756 A1 *  2/2007  Perfetto et al. ........... 455/412.1
2007/0099599 A1 *  5/2007  Smith et al. .............. 455/414.1
2008/0040354 A1 *  2/2008  Ray et al. ..................... 707/10

OTHER PUBLICATIONS

Notification of Transmittal of the International Search Report and the Written Opinion of the International Searching Authority, of the Declarator for the International Application No. PCT/US07/17091 (Jun. 26, 2008).

* cited by examiner

*Primary Examiner*—Tan Trinh
(74) *Attorney, Agent, or Firm*—Jenkins, Wilson, Taylor & Hunt, P.A.

(57) ABSTRACT

Methods, systems, and computer program products for over the air provisioning of soft cards on devices with wireless communications capabilities are disclosed. According to one method, a soft card provisioning application is instantiated on a device with wireless communications capabilities. A card number for a soft card desired to be provisioned on the device is obtained from a user of the device. The card number is communicated to a provisioning configuration server over an air interface. Card-issuer-specific challenges corresponding to the card number and a provisioning issuer server network address are obtained from the provisioning configuration server. The challenges are presented to the user, and the user's responses to the challenges are received. A connection is made to the provisioning issuer server corresponding to the network address. The challenge responses are communicated to the provisioning issuer server. Soft card personalization data for activating the soft card is received from the provisioning issuer server. The soft card is provisioned for use on the device based on the personalization data.

39 Claims, 13 Drawing Sheets

OTA Provisioning Architecture

METHODS, SYSTEMS AND COMPUTER PROGRAM PRODUCTS FOR OVER THE AIR (OTA) PROVISIONING OF SOFT CARDS ON DEVICES WITH WIRELESS COMMUNICATIONS CAPABILITIES

TECHNICAL FIELD

The subject matter described herein relates to provisioning of soft cards on devices with wireless communications capabilities. More particularly, the subject matter described herein relates to methods, systems, and computer program products for over the air provisioning of soft cards on devices with wireless communications capabilities.

BACKGROUND ART

Conventional physical payment cards, member cards, and loyalty cards are typically provisioned in a physical secure environment controlled by the card issuer. For example, the card issuer may have a secure facility where cards are provisioned before being sent to users. When a user receives a card, the user typically contacts the card issuer by telephone to activate the card.

In order to eliminate the need for users to carry physical cards, card issuers have begun issuing soft cards. As used herein, the term "soft card" refers to a software-implemented entity for facilitating transactions, such as payment transactions. Examples of soft cards include payment cards, such as credit cards, loyalty cards, member cards, identification cards, and other payment and no-payment cards.

A soft card may be provisioned on a device with wireless communications capabilities. Devices with wireless communication capabilities may interact with local card readers to enable transactions involving the soft card. Examples of devices with wireless communications capabilities include mobile phones, smart phones, key fobs, physical cards, and personal digital assistants with interfaces to local card readers. Interactions between a device and a reader may occur via an electric and/or magnetic field between the device and the reader. One type of communications channel that may be used between a device capable of supporting a soft card and a card reader for payment transactions is near field communications (NFC). Near field communications typically occur at a distance of within about one wavelength of the communications frequency being used between the device and the contactless card reader. Example of a contactless communications protocol that may be used in communications between a device capable of supporting a soft card and a contactless card reader is an ISO 14443 interface.

Devices with wireless communications capabilities may also be capable of data communications with remote entities. For example, devices with wireless communications capabilities may implement HTTP over TCP/IP over an air interface for communicating with remote entities. The air interface protocol used by a device with wireless communications capabilities may vary with the device. Examples of air interface protocols that may be used include GSM, GPRS, CDMA, Bluetooth, etc.

In order to utilize a soft card on a device with wireless communications capabilities, the soft card must be provisioned or loaded onto the device. One possible solution for provisioning soft cards on mobile devices is to provision the devices at a secure facility controlled by the card issuer. However, it is impractical to require users to bring their mobile phones or PDAs to a card issuer location for secure provisioning. Accordingly, one conventional provisioning method involves the user calling the card issuer and requesting a soft card. A human operator or a call center at the card issuer obtains user information. The card issuer validates the user and enqueues soft card provisioning requests for multiple users. When a batch of soft card provisioning requests has been obtained by the card issuer, the card issuer provisions the cards as a batch. The time from a soft card request until batch provisioning can range from 3 to 20 days. Such a delay is undesirable for users who desire to use their soft cards immediately.

Another problem with conventional card provisioning systems is that the systems are not scalable. For example, card-issuer-specific provisioning systems communicate with back end network devices using proprietary protocols. There is believed to be no system that is capable of provisioning cards issued by different card issuers using a single point of contact for mobile devices.

Accordingly, in light of these problems with conventional soft card provisioning methods, there exists a need for improved methods, systems, and computer program products for over the air provisioning of soft cards on devices with wireless communications capabilities.

SUMMARY

Methods, systems, and computer program products for over the air provisioning of soft cards on devices with wireless communications capabilities are disclosed. According to one method, a soft card provisioning application is instantiated on a device with wireless communications capabilities. A card number for a soft card desired to be provisioned on the device is obtained form the user of the device. The card number is communicated to a provisioning configuration server over an air interface.

Card-issuer-specific challenges corresponding to the card number and a provisioning issuer server network address are obtained from the provisioning configuration server. The challenges are presented to the user, and the user's responses to the challenges are received. A connection is made to the provisioning issuer server corresponding to the network address. The challenge responses are communicated to the provisioning issuer server. Soft card personalization data for provisioning the soft card is received from the provisioning issuer server. The soft card is provisioned for use on the device based on the personalization data.

The provisioning of a soft card over the air interface may occur over wireless connection, for example, using HTTP and TCP protocols. A TCP socket may be created for the provisioning connection. The physical layer of the connection may utilize, CDMA, Bluetooth, GPRS, or GSM air interface protocols. Provisioning may occur over the Internet or over a corporate or other intranet. Provisioning may be direct, in that provisioning does not require a voice call. That is, the device user may not be required to call a card issuer or a third party to initiate card provisioning. Provisioning may occur automatically by providing a provisioning application on a mobile device that establishes a connection with a provisioning configuration server in response to being started. Eliminating the need for the user to initiate a voice call to provision a soft card reduces the time required for the provisioning process.

The methods and systems described herein for over the air provisioning of soft cards on devices with wireless communications capabilities can be implemented using a computer program product comprising computer executable instructions embodied in a computer readable medium. Exemplary computer readable media suitable for implementing the subject matter described herein include chip memory devices, disk memory devices, programmable logic devices, application specific integrated circuits, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
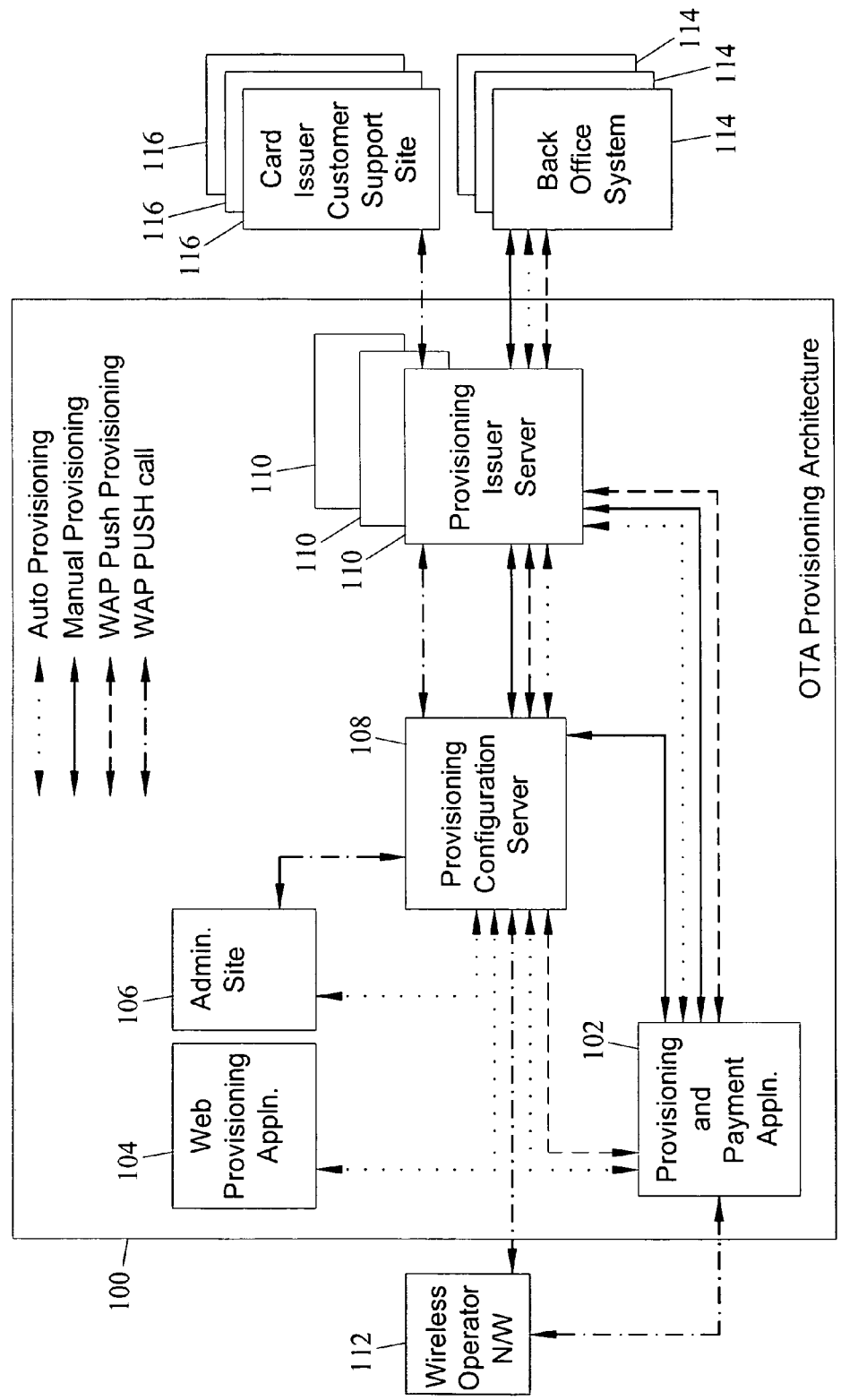
FIG. 1 is a block diagram of a system for over the air provisioning of a soft card on a device with wireless communications capabilities according to an embodiment of the subject matter described herein.

FIG. 1 is a block diagram of a provisioning system for provisioning soft cards on devices with wireless communications capabilities according to an embodiment of the subject matter described herein. Referring to FIG. 1, system 100 includes a provisioning and payment application 102, a web provisioning application 104, an administrative site 106, a provisioning configuration server 108, and one or more provisioning issuer servers 110 hosted in card issuer locations. Provisioning and payment application 102 may reside on a device with wireless communication capabilities, such as a mobile telephone, a smart phone, or a personal digital assistant. A wireless network operator 112 may provide the pathway for provisioning communications with provisioning and payment application 102. This pathway may be an IP connection that is separate from a voice call, eliminating the need for users to initiate provisioning using voice calls.

Provisioning and payment application 102 may provide a user interface for the end user to initiate the provisioning of one or more soft cards that reside on the wireless communications device. Provisioning and payment application 102 may communicate with the user to obtain authentication information and may contact provisioning issuer server 110 to obtain soft card personalization data. Exemplary steps performed by provisioning and payment application 102 will be described in further detail below. Provisioning and payment application 102 is also referred to herein as "provisioning application," since payment functionality is not essential to explaining the subject matter described herein.

Web provisioning application 104 may allow a user to perform one or more steps required for provisioning the soft card via a web interface. Web provisioning application 104 may reside on a web server associated with an entity that is separate from the card issuer. Web provisioning application 104 may allow a user to provision multiple cards in one provisioning transaction. Exemplary detailed steps performed by web provisioning application 104 will be described below.

Administration site 106 may provide customer support for provisioning soft cards on handheld devices. The functionality of administration site 106 is not essential to the subject matter described herein. Hence, additional detail will not be provided.

Provisioning configuration server 108 may store configuration and business process information for a plurality of different card issuers. For example, provisioning configuration server 108 may receive soft card provisioning requests from provisioning and payment application 102. Provisioning configuration server 108 may identify the card issuer associated with the request based on a card number or an identifier provided in the request. Provisioning configuration server 108 may obtain challenge data from the card issuer and may communicate that challenge data to provisioning and payment application 102. Provisioning configuration server 108 may provide a single point of contact for mobile device users to provision soft cards. In addition, provisioning configuration server 108 may be configured to communicate with multiple card issuers. As a result, provisioning configuration server 108 provides an easy-to-use, scalable solution to soft card provisioning.

Provisioning issuer servers 110 may reside at each different card issuer and may be integrated with each card issuer back office system to provide card provisioning data, card image and card financial information, such as account balance, rewards, pre-printed information on the card and personalized embossed information (expiration date, CVV, name on the card, PAN). For a soft card, the pre-printed and personalized embossed information may be displayed to the user via a graphical user interface associated with the device. Provisioning issuer servers 110 may communicate with provisioning and payment application 102 to authenticate a user and to deliver card personalization data and card image information to application 102. Provisioning issuer server 110 may also communicate with back office systems 114 and card issuer customer support sites 116. Back office systems 114 may store user's personal information and personalization data for soft cards. Customer support sites 116 may provide customer support for card issuer customers.

In the example illustrated in FIG. 1, the dotted arrows represent automatic provisioning, which is provisioning that involves web application 104 and then using provisioning and payment application 102 to provision multiple cards with single request using web application user name and password. The solid arrows represent manual provisioning, which is provisioning of individual cards one at a time using provisioning and payment application 102. The remaining arrows represent WAP push provisioning, which will be described in detail below.

Figure 2:
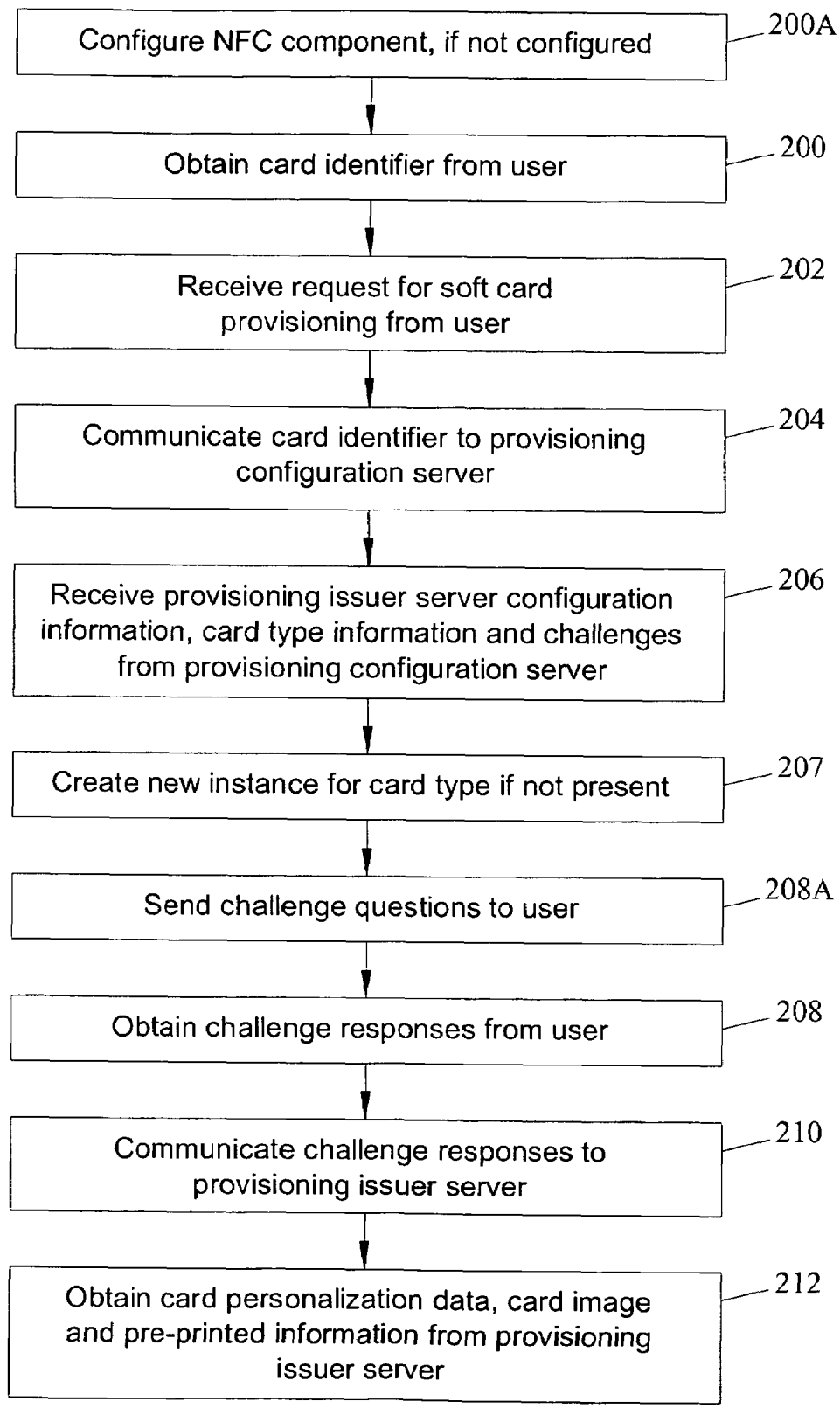
FIG. 2 is a flow chart illustrating exemplary overall steps for manually provisioning a soft card from the perspective of a soft card provisioning application according to an embodiment of the subject matter described herein.

FIG. 2 is a flow chart illustrating exemplary overall steps for provisioning the soft card on a device with wireless communication capabilities according to an embodiment of the subject matter described herein. The steps in FIG. 2 may be preformed by provisioning and payment application 102 and/ or web provisioning application 104. The steps illustrated in FIG. 2 are intended to be generic with regard to automatic or manual provisioning. Referring to FIG. 2, in step 200A, if device is used for first time, provisioning and payment application 102 will configure a secure memory embedded in the device along with a near field communication component. This process may not be repeated for returning user of provisioning and payment application 102. in step 200, a request for soft card provisioning is received from the user. For manual provisioning, this step may be performed by provisioning and payment application 102. For automatic provisioning, the step may be performed by web provisioning application 104.

In step 202, the card identifier is obtained from the user. The card identifier may be the personal account number (PAN) associated with the soft card request. For manual provisioning, step 202 may be performed by provisioning and payment application 102. For automatic provisioning, step 202 may be performed by web provisioning application 104.

In step 204, a card identifier is communicated to provisioning configuration server 108. In one exemplary implementation, provisioning configuration server 108 may have a 1 to n relationship with provisioning issuer servers 110. Accordingly, provisioning and payment application 102 and/or web provisioning application 104 may be configured with contact information for a single provisioning configuration server 108. Eliminating the need for provisioning and payment application 102 and/or web provisioning application 104 to be preconfigured with multiple card issuer identifications allows different cards issued by different issuers to be provisioned in a more efficient manner. In addition, using a provisioning configuration server 108 to control communications with provisioning and payment application 102, web provisioning application 104, and card issuer servers 110, makes system more scalable than card-issuer-specific provisioning systems. In a manual provisioning process, step 204 may be implemented by provisioning and payment application 102. In an automatic provisioning process, step 204 may be performed by a web provisioning application 104.

In step 206, provisioning and payment application 102 receives provisioning issuer server information, card type information, such as Paypass, Visa, Discover, and challenge information for the provisioning issuer server identified by provisioning configuration server 108. In step 207, provisioning and payment application 102 may create an instance of card type in secure memory for personalization, if no new instance is present for card type. In step 208A, provisioning and payment application 102 may send all challenge questions received by provisioning configuration server 108 for a specific card issuer to the user. In step 208, provisioning and payment application 102 obtains challenge response information from the user. In step 210, provisioning and payment application 102 communicates the challenge response to the provisioning issuer server. In step 212, provisioning and payment application 102 obtains card personalization data, card image and pre-printed card information and card embossed information from provisioning issuer server 110.

If provisioning and payment application 102 successfully receives the card personalization data over the air interface, then provisioning and payment application 102 provisions the soft card for use on the device by storing the personalization data in memory. If provisioning and payment application 102 fails to successfully receive the soft card personalization data, provisioning and payment application 102 may read card track information from a secure chip associated with the device to obtain and display the last four digits of a card number and display a default card image, either at provisioning time or at payment time.

Figure 3A:
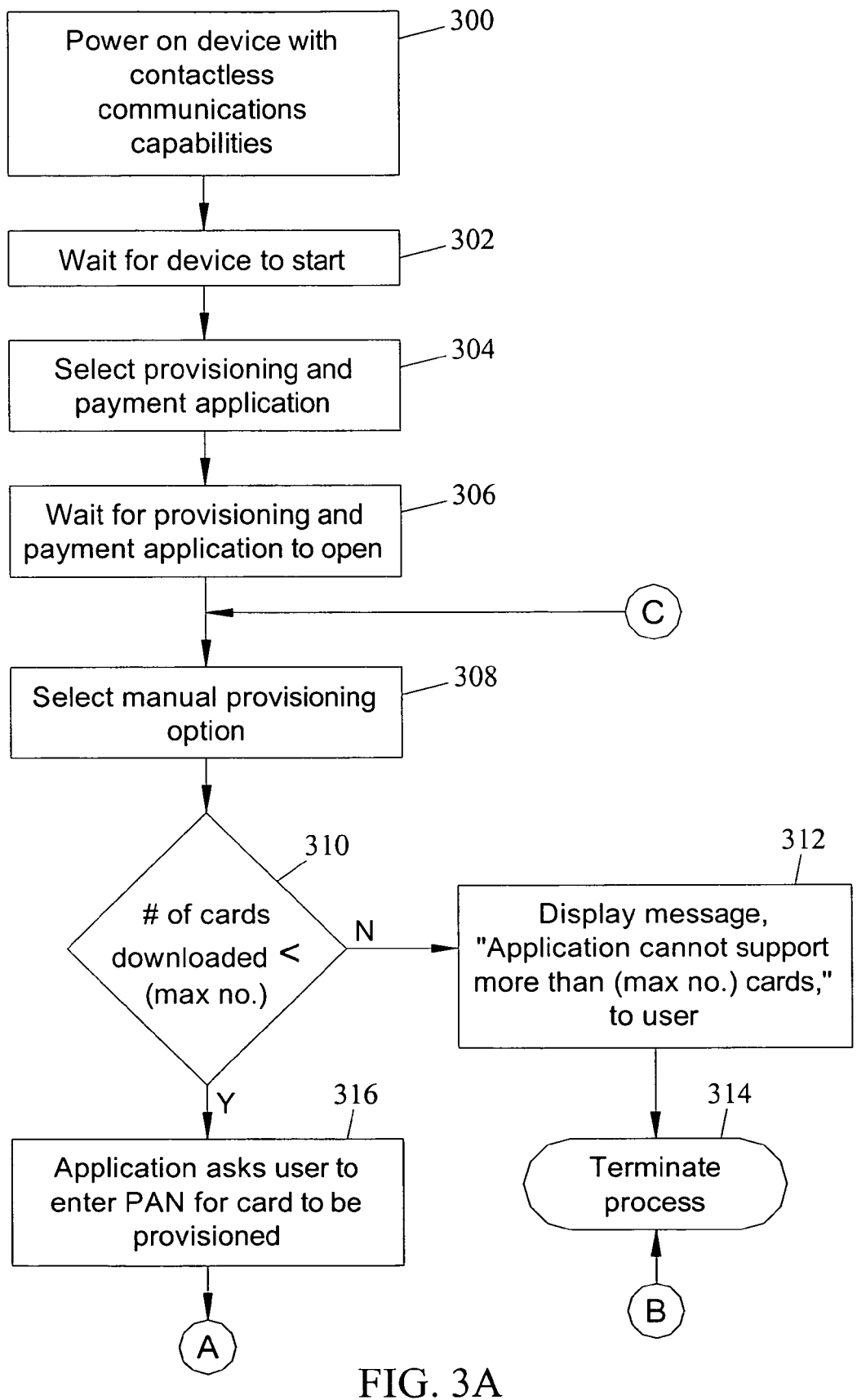
FIGS. 3A and 3B are a flow chart illustrating exemplary detailed steps for provisioning a soft card over an air interface from the perspective of a soft card provisioning application according to an embodiment of the subject matter described herein.
Figure 3B:
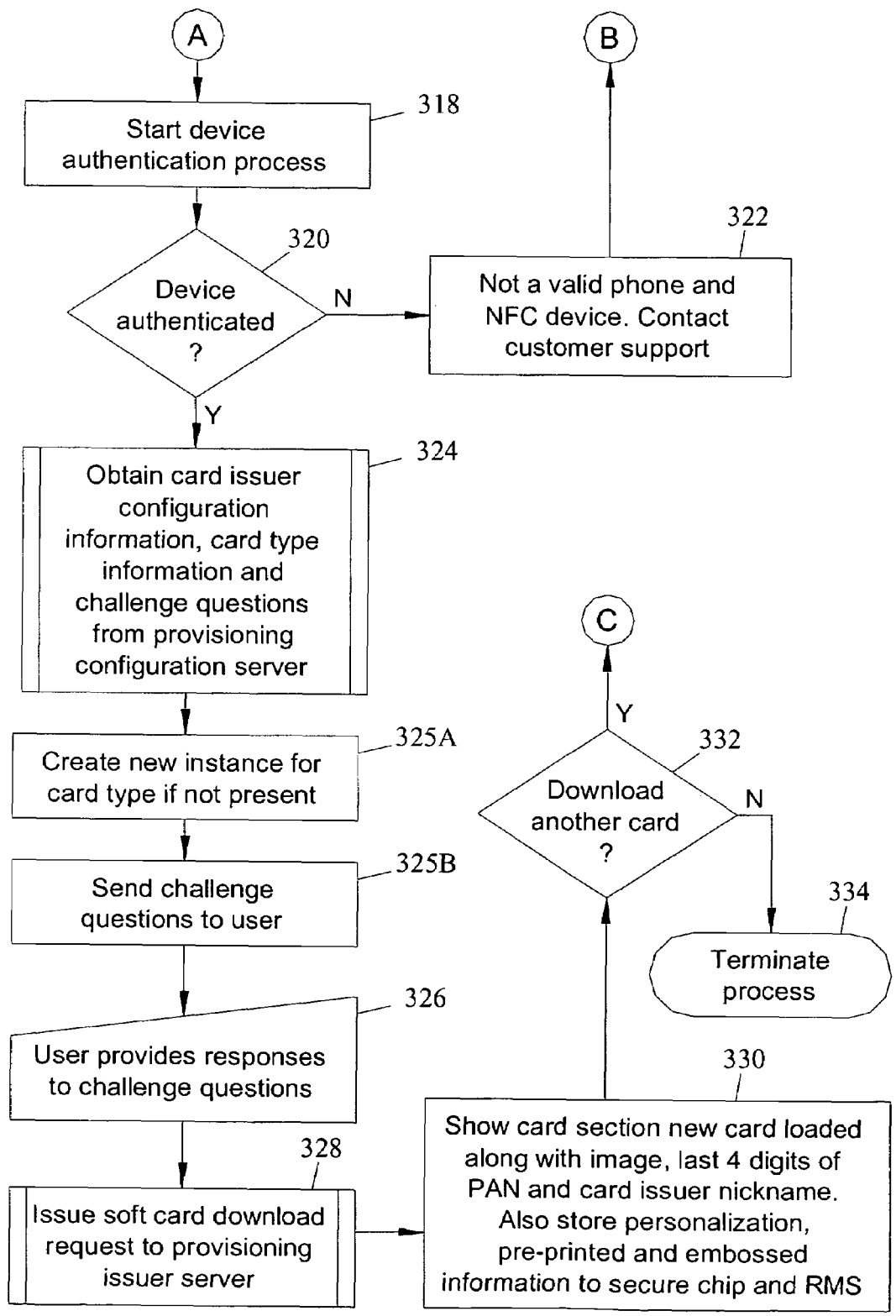

FIGS. 3A and 3B are a flow chart illustrating exemplary detailed steps performed by provisioning and payment application 102 in a manual provisioning process according to an embodiment of the subject matter described herein. Referring to FIG. 3A, in step 300, the device with wireless communication capabilities is powered on. In step 302, the user waits for the device to start. In step 304, the user selects provisioning and payment application 102. In step 306, the user waits for provisioning and payment application 102 to open.

In step 308, the user selects the manual provisioning option assuming that the near field communication component embedded with secure memory is already configured. As described above, manual provisioning includes provisioning the device with wireless communication capabilities, e.g., using the Internet (HTTP over TCP/IP), without preloading information in a web application. In step 310, application 102 determines whether the number of cards to be downloaded is less than a predetermined maximum number. The maximum number may be configurable by the developer of soft card provisioning and payment application 102. In step 312, if the number of cards to be downloaded is not less than the maximum number, control proceeds to step 314 where the manual provisioning process ends.

In step 310, if the number of cards to be downloaded is less than the maximum number, control proceeds to step 316 where application 102 asks the user to enter the PAN number for the card to be downloaded. Once the user enters the PAN number, control proceeds to step 318 in FIG. 3B where the application starts the authentication process. Detailed steps for authenticating the device will be described below. In step 320, it is determined whether the device is authenticated. If the device is not authenticated, control proceeds to step 322 where application 102 indicates that the phone is not a valid phone with a secure memory and near field communication component. Application 102 may display to the user a message to contact customer support. Control then proceeds to step 314 where the provisioning process ends.

In step 320, if the device is successfully authenticated, control proceeds to step 324 where application 102 obtains card issuer information, card type information and challenge question from provisioning configuration server 108. In step 325A, provisioning and payment application 102 may create a new instance of card type if not present. In step 325B, provisioning and payment application 102 may present the challenge questions to user. In step 326, the user provides response for the challenge questions. In step 328, application 102 issues a soft card card download request to the identified provisioning issuer server. The identified provisioning issuer server 110 may communicate with the card issuer back end network to validate the user using the challenge response information provided in the soft card download request. Once the user is validated, provisioning issuer server 110 may provide the soft card personalization data to provisioning and payment application 102. Application 102 receives the soft card personalization data from the provisioning issuer server. In step 330, application 102 displays the card image to the user with card nickname and last 4 digits of card PAN number and may store embossed information and pre-printed information in secure memory and record management store (RMS) respectively. In step 332, application 102 determines whether the user wants to download another card. If the user answers affirmatively, control returns to step 308 where the provisioning process restarts for the next card. If the user does not desire to download another card, control proceeds to step 334 where the provisioning process ends.

Figure 4A:
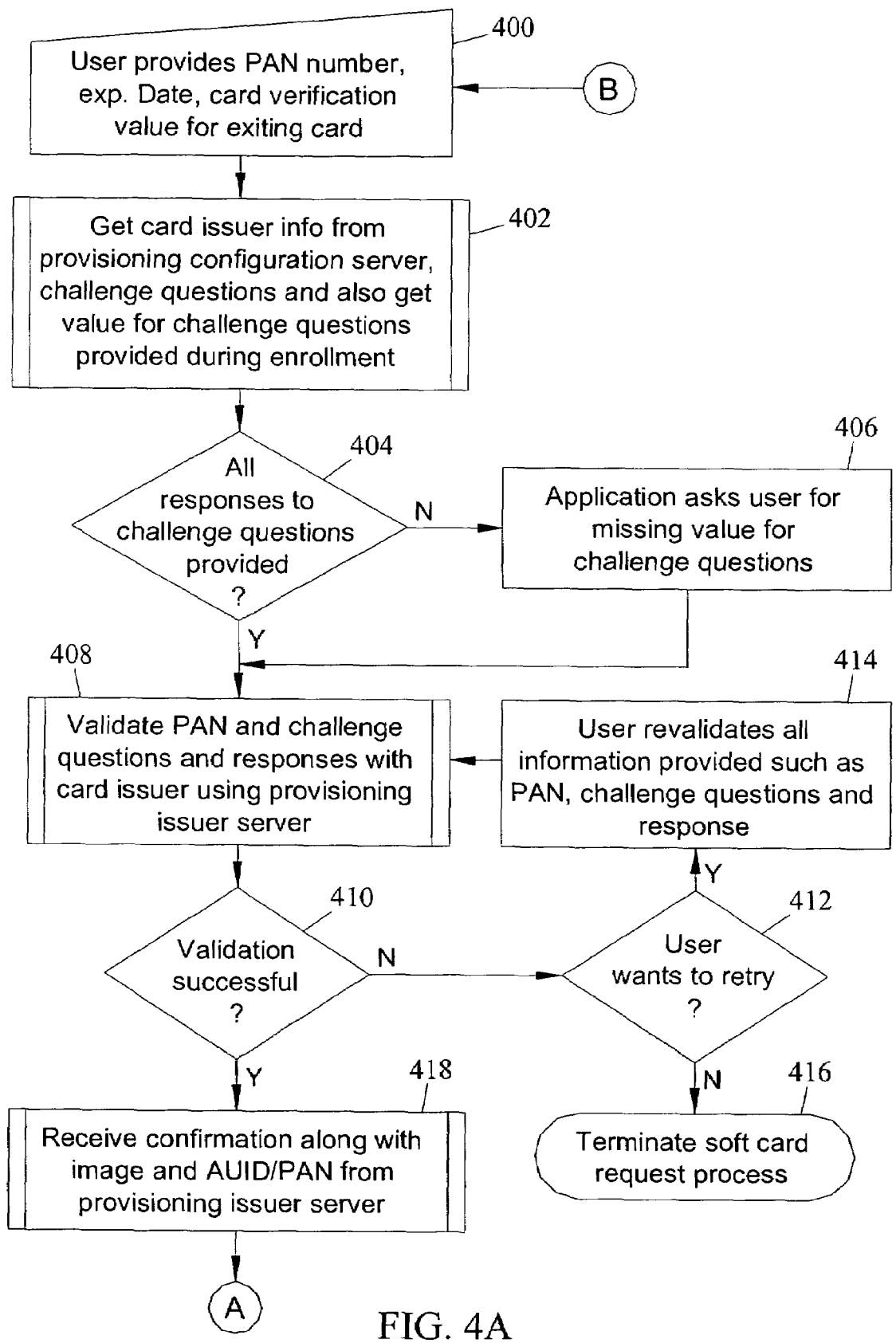
FIGS. 4A and 4B are a flow chart illustrating exemplary detailed steps for preloading provisioning information for a soft card using a web interface according to an embodiment of the subject matter described herein.
Figure 4B:
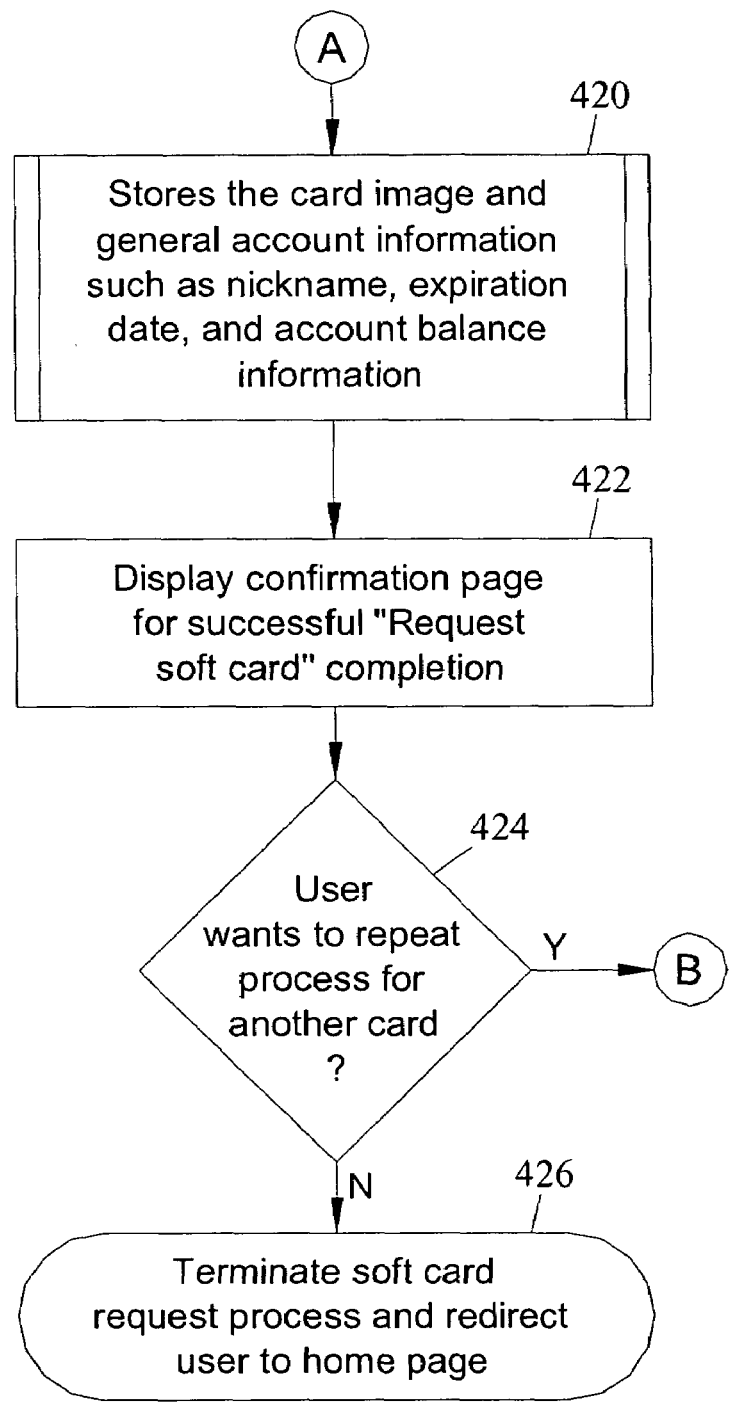

As stated above, in one implementation, a user may preload some of the information required for the provisioning process using web application 104 for a single card or for multiple cards. The process of pre-validating and preloading information in web application 104 to facilitate soft card provisioning is referred as to a soft card request. FIGS. 4A and 4B illustrates exemplary steps that may be performed using web application 104 in initiating a soft card request. Referring to FIG. 4A, in step 400, a user provides a PAN number, an expiration date, and other card verification values for a soft card desired to be provisioned. In step 402, web application 104 communicates the card information to provisioning configuration server 108 and obtains challenge questions and card issuer identification information from provisioning configuration server 108. In step 404, web provisioning application 104 determines whether responses to the challenge questions have been provided by the user during enrollment. If all responses to the challenge questions have not been provided, control proceeds to step 406 where web application 104 asks the user for missing responses to the challenge questions.

In step 408, web provisioning application 104 communicates the PAN and responses to the challenge questions to the card issuer. The card issuer validates the card information and responses to the challenge questions with user information stored in card issuer back office database provided during physical card issuance In step 410, web provisioning application 104 determines whether the validation was successful. If the validation was not successful, control proceeds to step 412 where application 104 asks the user whether the user wants to retry. If the user selects yes, control proceeds to step 414 where the user re-enters the validation information. Validation is then reattempted by the card issuer.

If validation is successful, control proceeds to step 418 where application 104 receives confirmation of the validation, the card image, and the account user identifier and/or PAN. Referring to FIG. 4B, in step 420, application 104 stores the card image and general account information, such as nickname, expiration date, and account balance information. In step 422, application 104 displays a confirmation page indicating that the soft card request was successfully completed. In step 424, application 104 determines whether the user wants to repeat the process for another card. If the user desires to repeat the process for another card, control returns to step 400 and the steps for a soft card request are repeated. If the user does not desire to process another card, control proceeds to step 426 where the soft card request process is terminated and the user is redirected to the home page of the provisioning entity.

Figure 5A:
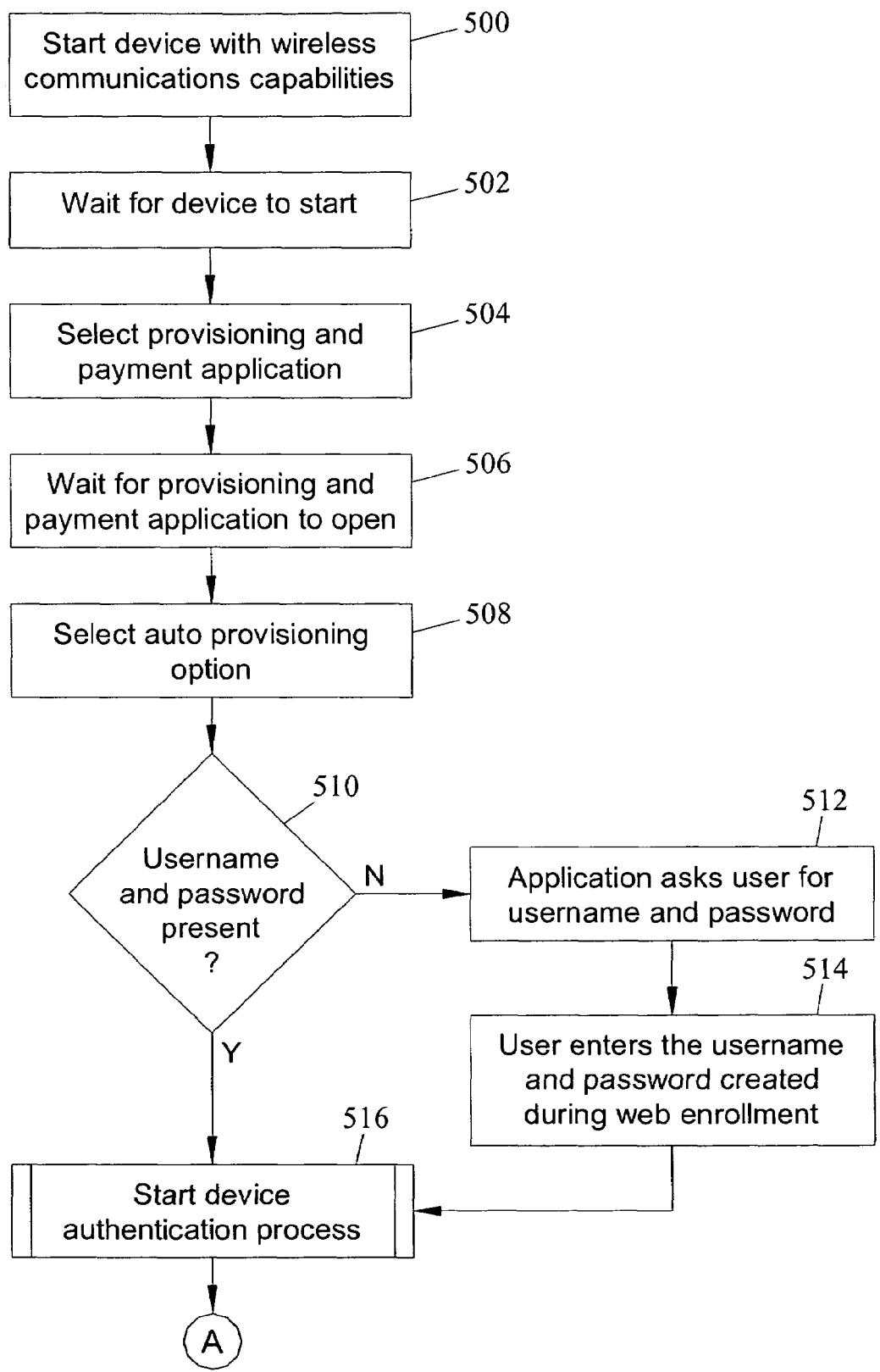
FIGS. 5A and 5B are a flow chart illustrating exemplary detailed steps performed by a soft card provisioning application for automatically provisioning a soft card according to an embodiment of the subject matter described herein.
Figure 5B:
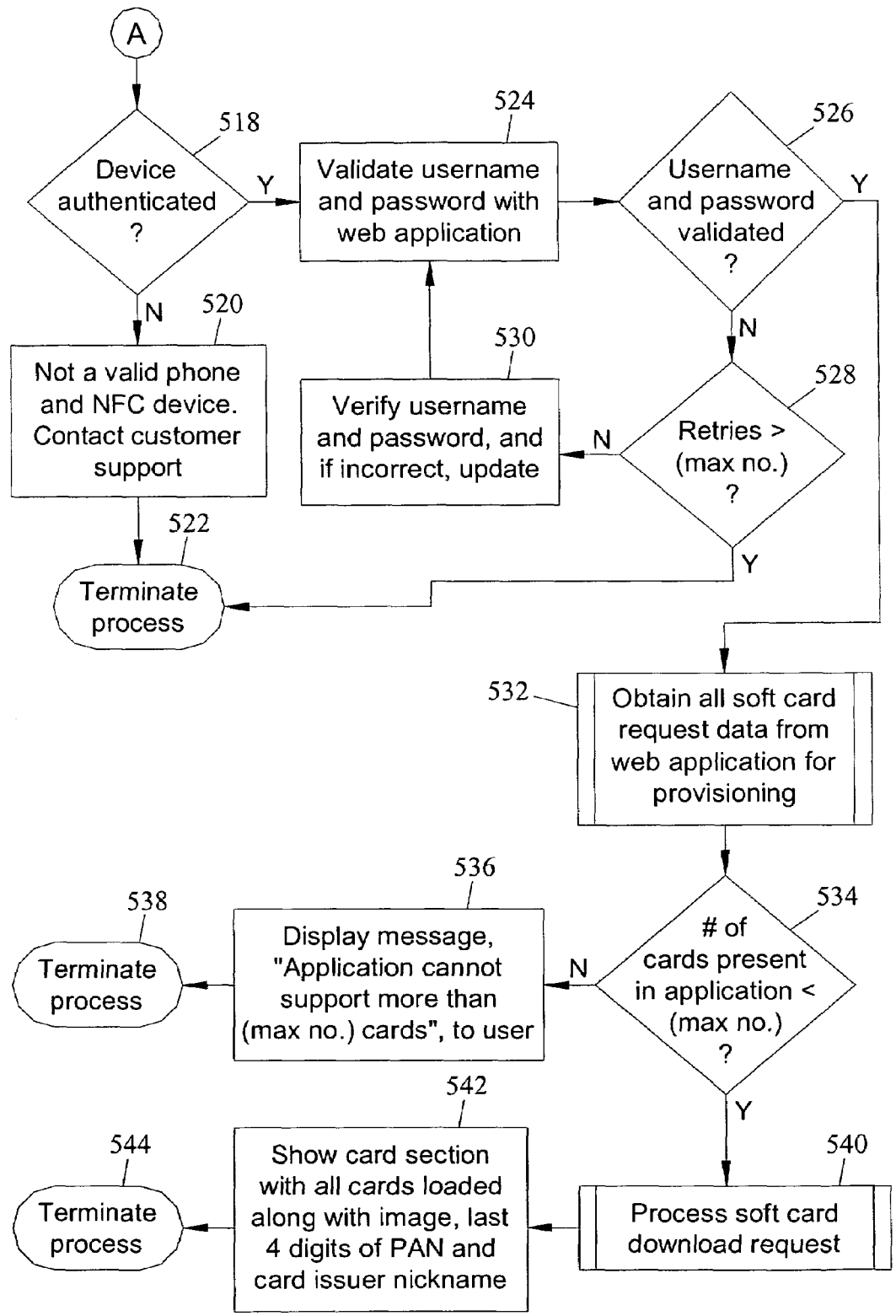

As stated above, once a user has prestored one or more soft cards using application 104 and the process illustrated in FIGS. 4A and 4B, the user may automatically provision the soft cards on his or her device with wireless communication capabilities using the auto provisioning process. FIGS. 5A and 5B are a flow chart illustrating exemplary steps that may be performed by provisioning and payment application 102 in implementing the auto provisioning process according to an embodiment of the subject matter described herein. Referring to FIG. 5A, in step 500, the user powers on the device with wireless communication capabilities. In step 502, the user waits for the device to start. In step 504, the user selects provisioning and payment application 102. In step 506, the user waits for provisioning and payment application 102 to open.

Once provisioning and payment application 102 opens, in step 508, the user selects the auto provisioning option. Control then proceeds to step 510 where it is determined whether the user's name and password associated with web application 104 are prestored on the device. If the user's name and password are not prestored on the device, control proceeds to step 512 where provisioning and payment application 102 asks the user for the user name and password. In step 514, the user enters the user name and password created during a web enrollment process. Control then proceeds to step 516 where the device authentication process starts. As described above, device authentication may include communicating with provisioning configuration server 108 to determine whether the device is authorized to receive provisioning information.

Referring to FIG. 5B, in step 518, it is determined whether the authentication was successful. If the authentication was not successful, control proceeds to step 520 where provisioning and payment application 102 indicates that the device is not a valid near field communications (or other wireless communications) handheld mobile trusted device and instructs the user to contact customer support. In step 522, the auto provisioning process ends.

Returning to step 518, if the device is successfully authenticated, control proceeds to step 524 where the user name and password are validated with web application 104 through provisioning configuration server 108. In step 526, it is determined whether the user name and password have been validated. If the user name and password have not been validated, control proceeds to step 528 where it is determined whether the retries exceed a maximum number of retries. If the retries have not exceeded the maximum number, control proceeds to step 530 where the user is prompted to enter the user name and password again.

In step 526, if the user name and password are validated, control proceeds to step 532 where the soft card request data previously stored with web application 104 for the user is downloaded to provisioning and payment application 102.

In step 534, it is determined whether the number of cards present in provisioning and payment application 102 is less than a maximum number of cards. The number is not less than the maximum number, control proceeds to step 536 where a message is displayed to the user indicating that the application cannot support more than the maximum number of cards. In step 538, the provisioning process ends.

Returning to step 534, if the number of cards present in the application is less than the maximum number, control proceeds to step 540 where the card personalization information is downloaded to the device with wireless communication capabilities. The personalization process will process one card personalization at a time, if configured number of card configured in web application 104 is greater than 1. In step 542, the device displays the card to the user. In step 544, the automatic provisioning process ends.

Figure 6:
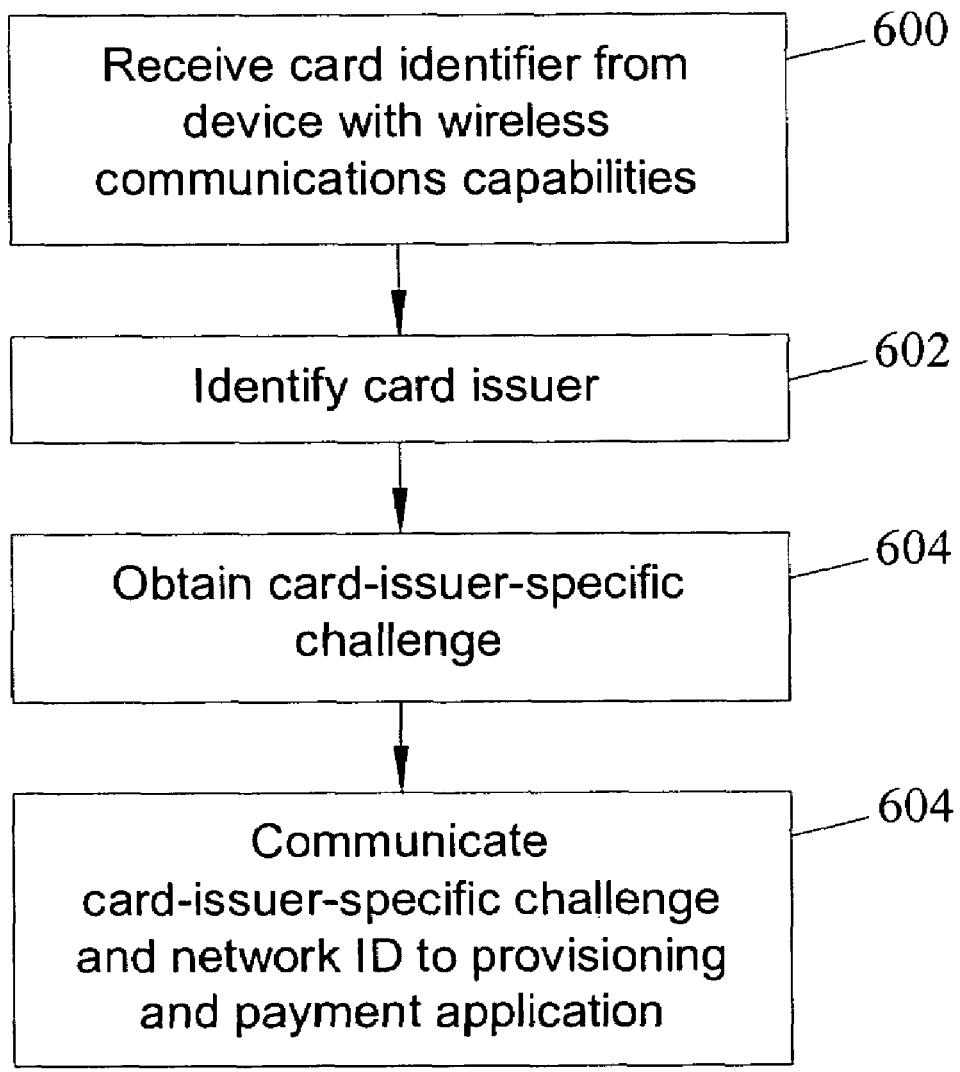
FIG. 6 is a flow chart illustrating exemplary overall steps for provisioning a soft card from the perspective of a provisioning configuration server according to an embodiment of the subject matter described herein.

As stated above, provisioning configuration server 108 acts as a point of contact for provisioning and payment application 102 and multiple different card issuers. FIG. 6 is a flow chart illustrating the exemplary overall steps that may be performed by provisioning configuration server 108 in provisioning a soft card on a device with wireless communication capabilities according to an embodiment of the subject matter described herein. Referring to FIG. 6, in step 600, provisioning configuration server 108 receives card identifier information from a device with wireless communication capabilities. In step 602, server 108 identifies the card issuer by performing a look up in a database that matches the issuer identification number (IIN) (retrieved from the PAN) numbers to card issuers. Table 1 shown below illustrates exemplary entries that may be included in such a database.

TABLE 1

IIN Number to Card Issuer Mappings

| IIN Number | Provisioning Issuer Server IP Address |
|---|---|
| XXXXXX-XXXXYY | 128.128.0.1 |
| AAAAAA-AAAABB | 128.256.0.1 |
| EEEEEE-EEEEFF | 192.128.0.1 |
| JJJJJJ-JJJJKK | 192.256.0.1 |

In Table 1, the first column includes the IIN number range. The entries illustrated in Table 1 containing alphabetic characters are intended to represent the numeric characters that correspond to an IIN number. As stated above, an IIN number is an issuer identification number of the card issuer issued by ISO. The issuer identification number may be associated with a credit, debit, or charge card. The IIN number is usually the first 3-6 digits of the PAN printed on the face of a physical card or on a graphical image of a soft card. The second column in Table 1 indicates provisioning issuer server IP addresses for different provisioning issuer servers. Provisioning configuration server 108 may provide this information to provisioning and payment application 102 to allow provisioning and payment application 102 to establish secure communication and obtain the soft card personalization data.

In step 604, provisioning configuration server 108 retrieve card-issuer-specific challenge questions from the database configured for specific card issuer. In step 606, provisioning configuration server 108 communicates the card-issuer-specific challenge questions and card issuer identification information to the provisioning and payment application 102 that resides on the handheld mobile trusted device requesting provisioning of the soft card.

Figure 7A:
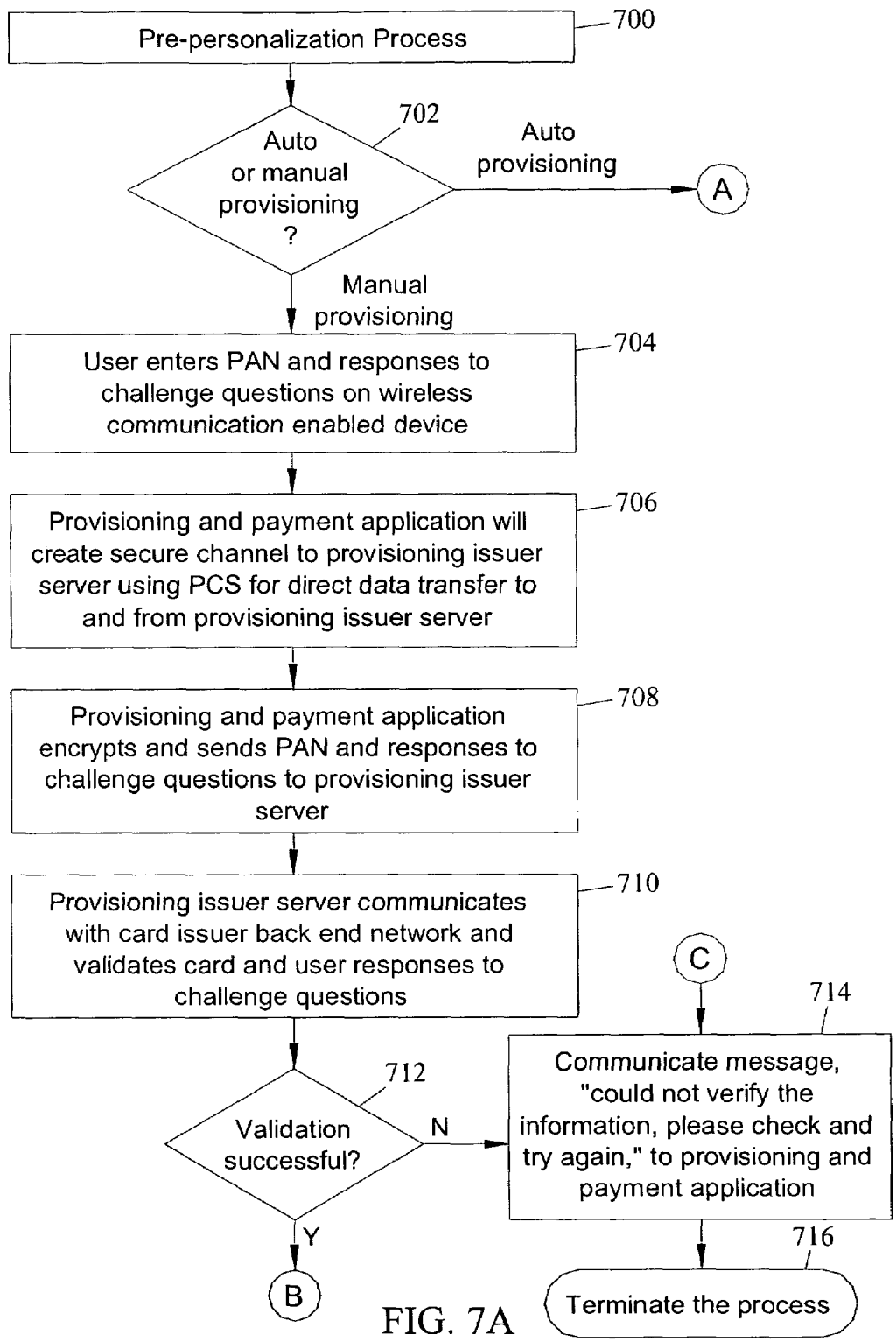
FIGS. 7A and 7B are a flow chart illustrating exemplary detailed steps for the overall provisioning process according to an embodiment of the subject matter described herein.
Figure 7B:
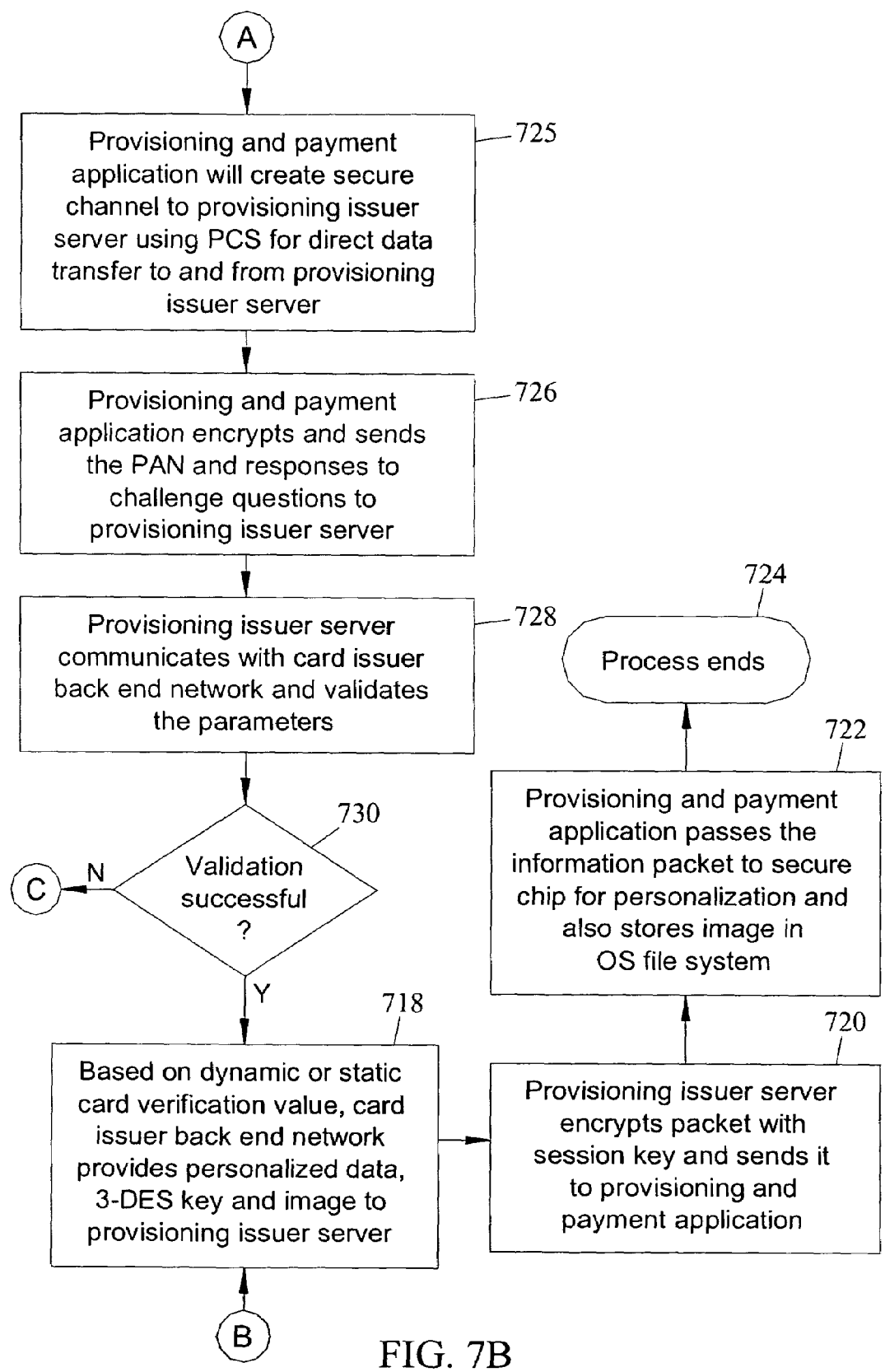

FIGS. 7A and 7B are a flow chart illustrating exemplary detailed steps for both manual and automatic soft card provisioning according to an embodiment of the subject matter described herein. Referring to FIG. 7A, in step 700, provisioning and payment application 102 performs a pre-personalization process. During the pre-personalization process, provisioning and payment application 102 may change or manage an encryption key to be used for establishing secure communications. A pre-personalization process may configure base payments and non-payments applets in the secure chip of the near field communication component through provisioning and payment application 102. Since the functionality of the payment portion is not essential to explaining the subject matter described herein, further description of its operation will not be described.

In step 702, it is determined whether automatic or manual provisioning is being performed. If manual provisioning is being performed, control proceeds to step 704 where the user enters the PAN and response to the challenge questions on the wireless-communications-enabled device. In step 706, provisioning and payment application 102 creates a secure channel to provisioning issuer server 110 through provisioning configuration server 108 for direct data transfer to and from provisioning issuer server 108.

In step 708, provisioning and payment application 102 encrypts and sends the PAN identification information and the response to the challenge questions to provisioning information server 708. In step 710, provisioning information server 110 communicates the PAN and the response to the challenge questions to the card issuer back end network.

In step 712, provisioning issuer server 110 determines whether the data has been validated. If the data has not been validated, control proceeds to step 714 where provisioning and payment application 102 indicates that the challenge information entered by the user could not be validated. The user may be prompted to try again. In step 716, the process terminates.

Returning to step 712, if the data is validated, control proceeds to step 718 in FIG. 7B where the card issuer back end network provides card personalization data, an encryption key, and a card image to provisioning an issuer server 110. In step 720, provisioning issuer server 110 encrypts a packet with the session key and sends it to provisioning and payment application 102. In step 722, provisioning and payment application 102 sends the card personalization data to a secure chip present on the mobile trusted handheld device for personalization of the soft card and also stores an image of the soft card in the operating system file system. In step 724, the manual provisioning process ends.

Returning to step 702 in FIG. 7A, if automatic provisioning is selected, control proceeds to step 725 in FIG. 7B where provisioning and payment application 102 creates a secure channel to provisioning issuer server 110 through provisioning configuration server 108 for direct data transfer to and from provisioning issuer server 108. In step 726, provisioning and payment application 102 encrypts and sends the PAN and challenge questions and its response received by web application 104 to provisioning issuer server 110 one at a time. In step 728, provisioning issuer server 110 communicates to the card issuer back end network the responses to the challenge questions for the PAN requested for download. In step 730, it is determined whether the data is validated. If the data is not validated, step 714 and 716 are performed, as described above. If the data is validated, steps 718 through 724 are performed to load the card image and personalization data on the device.

Figure 8A:
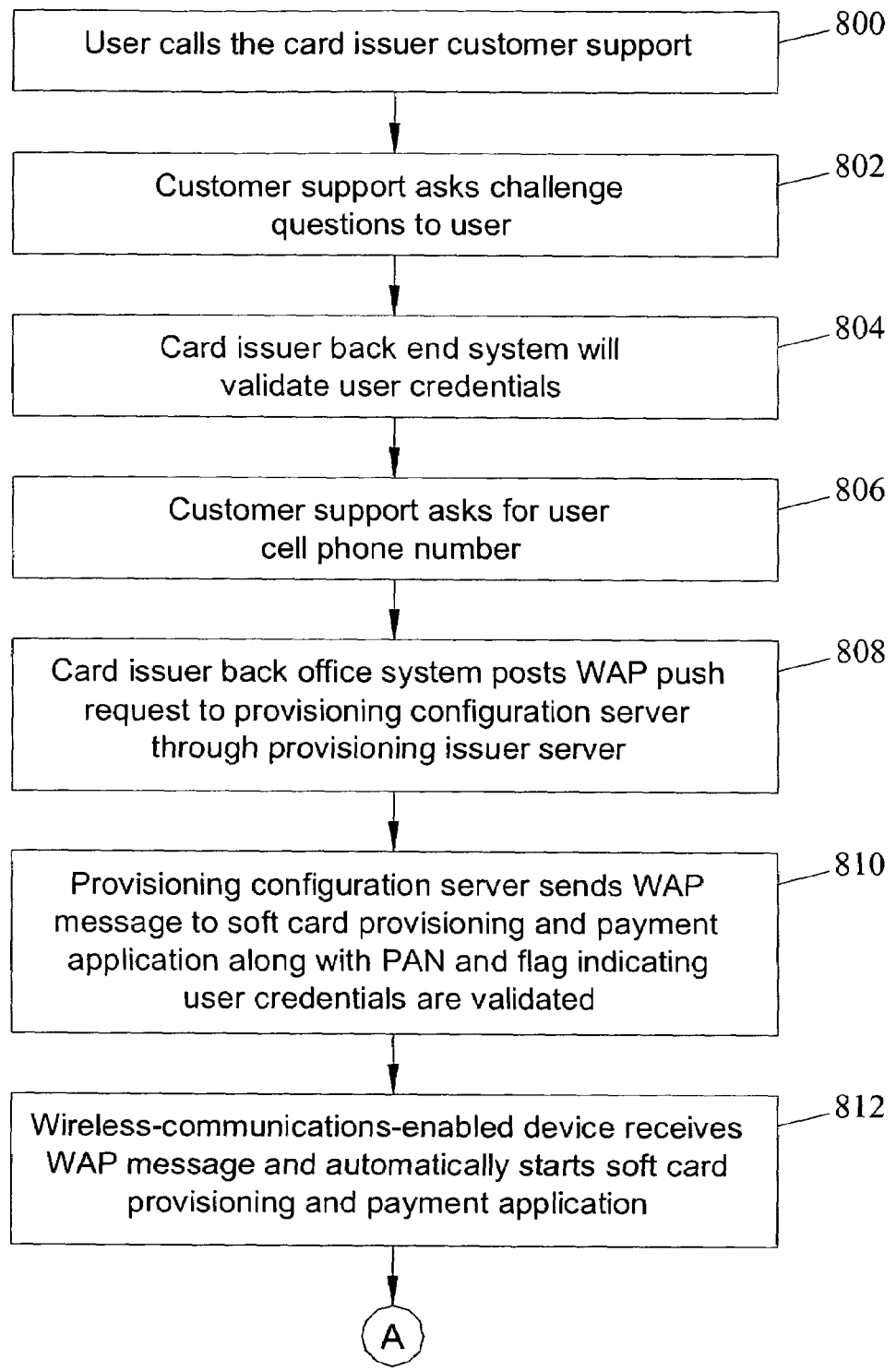
FIGS. 8A and 8B are a flow chart illustrating exemplary steps for provisioning a soft card using WAP push methods according to the embodiment of the subject matter described herein.
Figure 8B:
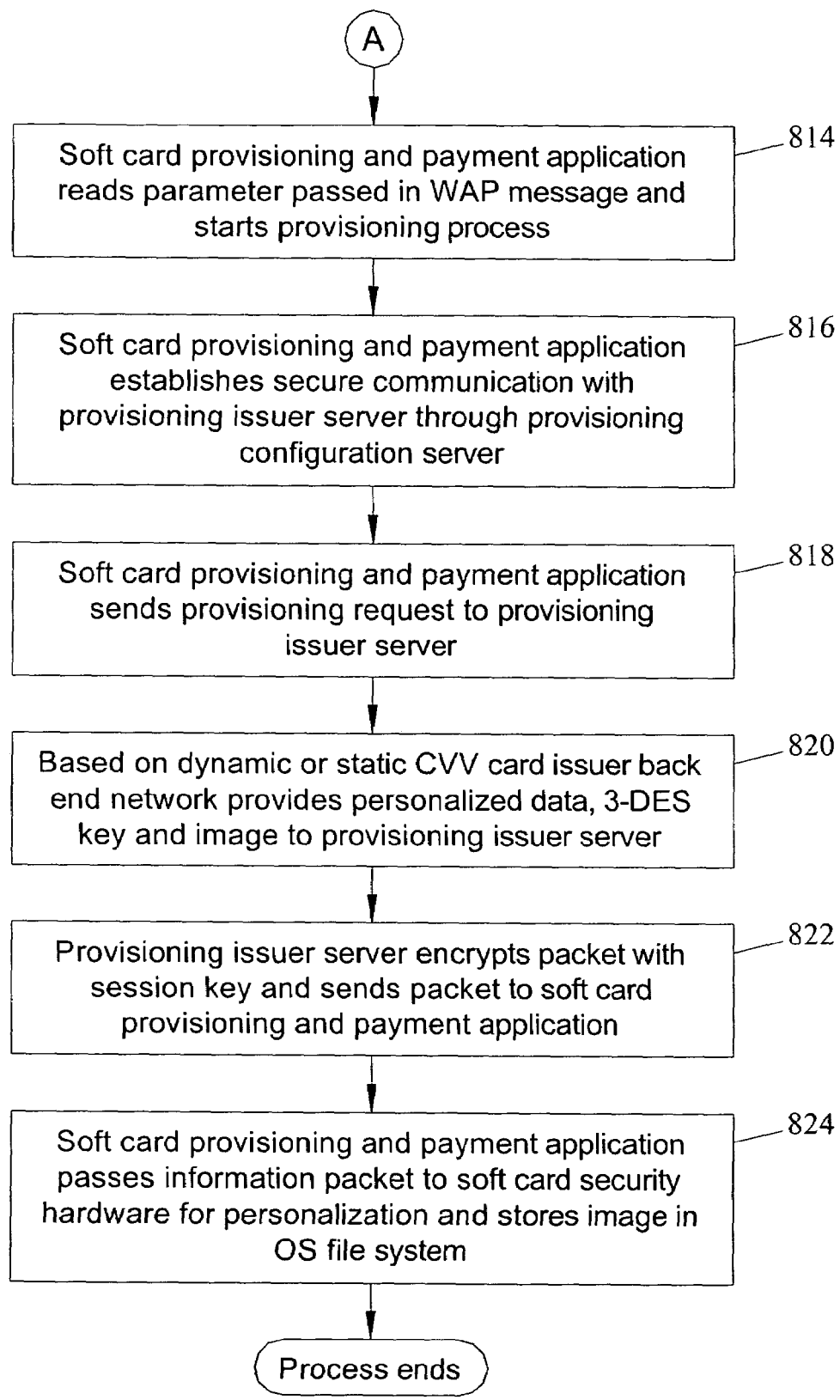

Returning to FIG. 1, another method for provisioning a soft card on a device with wireless communications capabilities is WAP push provisioning. WAP or wireless application protocol is a protocol for delivering information to mobile devices. FIGS. 8A and 8B are a flow chart illustrating exemplary steps for provisioning a soft card using WAP push provisioning according to an embodiment of the subject matter described herein. Referring to FIG. 8A, in step 800, a user contacts card issuer customer support via telephone. The user may provide the mobile phone number, PAN number, CVV and expiration date embossed on the plastic card for the soft card that the user desires to provision on a mobile device.

In step 802, customer support asks challenge questions to the user. The challenge question may be any card-issuer-specific challenge as described above. In step 804, the card issuer back office application validates the user credentials based on the information provided by the user to customer support.

In step 806, the card issuer back office application posts a WAP push request containing provisioning information for the card to provisioning configuration server 108 through provisioning issuer server 110. In step 808, customer support may ask for a cell phone number from user. In step 810, provisioning configuration server 108 sends a WAP message to soft card provisioning and payment application 102 along with a PAN and flag, indicating user credentials are validated, and card issuer information. In step 812, the wireless-communications-enabled device receives the WAP message and automatically starts provisioning and payment application 102.

In step 814, soft card provisioning and payment application 102 reads the parameters passed in the WAP message and starts the provisioning process. In step 816, soft card provisioning and payment application 102 establishes secure communications with provisioning issuer server 110 through provisioning configuration server 108. In step 818, soft card provisioning and payment application 102 sends the provisioning request to provisioning issuer server 110.

In step 820, based on a static or dynamic card verification value, the card issuer back end network provides card personalization data, an encryption key, and a card image to provisioning issuer server 110. In step 824, provisioning issuer server 110 encrypts the packet with a session key and sends it to provisioning and payment application 102. In step 826, soft card provisioning and payment application 102 passes the information to secure chip on the device for personalization and stores the card image in the operating system file system.

It will be understood that various details of the invention may be changed without departing from the scope of the invention. Furthermore, the foregoing description is for the purpose of illustration only, and not for the purpose of limitation.

What is claimed is:

1. A method for over the air (OTA) provisioning a soft card on a device having wireless communications capabilities, the method comprising:
   (a) instantiating a soft card provisioning application on a device with wireless communications capabilities;
   (b) obtain a card number for a soft card desired to be provisioned on the device;
   (c) communicating the card number to a provisioning configuration server over an air interface;
   (d) receiving at least one card-issuer-specific challenge question and a provisioning issuer server network address from the provisioning configuration server;
   (e) presenting the at least one challenge question to a user of the device and receiving at least one response to the at least one challenge question;
   (f) connecting to a provisioning issuer server corresponding to the network address and communicating the at least one response to the provisioning issuer server; and
   (g) receiving, over the air interface, soft card personalization data from the provisioning issuer server and, in response to successful receipt of the soft card personalization data, provisioning the soft card for the use on the device with wireless communication capabilities based on the personalization data.

2. The method of claim 1 comprising sending a confirmation from provisioning and payment application to the provisioning configuration server and severing provisioning control between the provisioning and payment application and the soft card once the soft card is successfully provisioned.

3. The method of claim 1 wherein the device with wireless communications capabilities includes at least one of general packet radio service (GPRS), global system for mobile communications (GSM), code division multiple access (CDMA), Internet, and Bluetooth communications capabilities.

4. The method of claim 1 comprising, in response to failing to successfully receive the soft card personalization data, reading card track information from a secure chip associated with the device to obtain and display the last four digits of a card number and displaying a default card image.

5. The method of claim 1 wherein the soft card comprises a card selected from the group consisting of a loyalty card, a member card and a non-payment card.

6. The method of claim 1 wherein the soft card comprises a software-implemented version of a physical payment card.

7. The method of claim 1 wherein the soft card comprises a software-implemented card for which no corresponding physical card exists.

8. The method of claim 1 wherein obtaining a card number includes receiving a card number via a keypad associated with the device.

9. The method of claim 1 wherein obtaining a card number includes obtaining a personal account number (PAN) from the user.

10. The method of claim 1 wherein the device having wireless communications capabilities comprises a device selected from a group consisting of a mobile telephone, a smart phone, a key fob, a physical card, and a personal digital assistant.

11. The method of claim 1 wherein the at least one card-issuer-specific challenge includes a request for security information from the user.

12. The method of claim 1 wherein receiving soft card personalization data includes receiving a graphical image of the soft card to be displayed on a display associated with the device.

13. The method of claim 1 wherein receiving a soft card request includes receiving a request for provisioning at least one soft card via a web interface.

14. The method of claim 1 comprising initiating the provisioning application to start a provisioning process by sending a wireless application protocol (WAP) push message to the provisioning application.

15. The method of claim 1 wherein receiving the soft card personalization data over the air interface includes receiving the soft card personalization data over a TCP/IP connection implemented over the air interface.

16. A method for over the air (OTA) provisioning of a soft card on a device having wireless communications capabilities using a provisioning configuration server, the method comprising:
   at a provisioning configuration server:
   (a) storing issuer configuration data and challenge questions for a plurality of different card issuers;
   (b) receiving a soft card request for provisioning a soft card on a device with wireless communications capabilities, the request including a card identifier;
   (c) identifying, based on the card identifier, a card issuer for the soft card request; and
   (d) presenting at least one of the challenge questions and network identification for the card issuer to the device over the air interface.

17. The method of claim 16 wherein the soft card comprises a card selected from a group consisting of a payment card, loyalty card, a member card and a non-payment card.

18. The method of claim 16 wherein the soft card comprises a software-implemented version of a physical card.

19. The method of claim 16 wherein the soft card comprises a software-implemented card for which a corresponding physical card does not exist.

20. The method of claim 16 wherein receiving a soft card request including a card identifier includes obtaining a personal account number (PAN) number.

21. The method of claim 16 wherein receiving a soft card request including a card identifier includes receiving a soft card from the device over a connection established over an air interface without requiring a voice call.

22. The method of claim 16 wherein receiving a soft card request including a card identifier includes receiving a soft card request the card identifier from a user over a web interface.

23. The method of claim 16 wherein receiving a soft card request includes receiving a wireless application protocol (WAP) push message containing card provisioning information from a card issuer.

24. The method of claim 16 wherein the device comprises a device selected from a group consisting of a mobile phone, a smart phone, a physical card, a key fob, and a personal digital assistant.

25. The method of claim 16 wherein steps (a)-(d) are preformed in real time.

26. The method of claim 16 wherein the steps (a)-(d) are performed a plurality of times to provision a plurality of different soft cards in real time.

27. The method of claim 16 wherein the step (d) includes presenting the challenge and network identification to the device over a TCP/IP connection implemented over an air interface.

28. A system for over the air (OTA) provisioning of a soft card on a device with wireless communications capabilities, the system comprising:
  (a) a soft card provisioning application for executing on a device with wireless communications capabilities, for obtaining a card number from a user, and for communicating the card number over an air interface;
  (b) a provisioning configuration server for receiving the card number from the soft card provisioning application, for identifying a card issuer corresponding to the card number, and for communicating card issuer network identification information and at least one challenge to the soft card provisioning application over the air interface; and
  (c) a provisioning issuer server for receiving a connection from the soft card provisioning application, for receiving at least one response to the at least one challenge, and for sending personalization data to the soft card provisioning application for provisioning the soft card.

29. The system of claim 28 wherein the provisioning issuer server is integrated with a card issuer back office system.

30. The system of claim 28 wherein the soft card comprises a card selected from a group consisting of a payment card, a loyalty card, a member card, and a non-payment card.

31. The system of claim 28 wherein the soft card comprises a software-implemented version of a physical card.

32. The system of claim 28 wherein the soft card comprises a software-implemented for which a corresponding physical card does not exist.

33. The system of claim 28 wherein obtaining a card identifier includes obtaining a physical account number (PAN) number.

34. The system of claim 28 wherein obtaining a card identifier includes obtaining the card identifier via a user interface associated with the device.

35. The system of claim 28 wherein the soft card provisioning application, the provisioning configuration server, and the provisioning issuer server are adapted to provision the soft card in real time.

36. The system of claim 28 comprising a web provisioning application for receiving provisioning information for a plurality of cards and for communicating the information to the provisioning configuration server, wherein the provisioning configuring server is adapted to identify card issuers for each of the provisioning requests and to effect provisioning of a plurality of soft cards in real time.

37. The system of claim 28 wherein the soft card provisioning application is adapted to communicate with the provisioning configuration server using a TCP/IP connection established over the air interface.

38. A computer program product comprising computer executable instructions embodied in a computer readable medium for performing steps comprising:
  (a) instantiating a soft card provisioning application on a device with wireless communications capabilities;
  (b) obtaining a card number for a soft card desired to be provisioned on the device;
  (c) communicating the card number to a provisioning configuration server over an air interface;
  (d) receiving, over the air interface, at least one card-issuer-specific challenge and a provisioning issuer server network address from the provisioning configuration server;
  (e) presenting the at least one challenge to a user of the device and receiving at least one response to the at least one challenge;
  (f) connecting to a provisioning issuer server corresponding to the network address and communicating the at least one challenge response to the provisioning issuer server; and
  (g) receiving soft card personalization data from the provisioning issuer server and provisioning the soft card for the use on the device with wireless communications capabilities based on the personalization data.

39. A computer program product comprising computer executable instructions embodied in a computer readable medium for performing steps comprising:
  (a) storing identification data and challenge information for a plurality of different card issuers;
  (b) receiving a soft card request for provisioning a soft card on a device with wireless communications capabilities, the request including a card identifier;
  (c) identifying, based on the card identifier, a card issuer for the soft card request; and
  (d) presenting at least one challenge and network identification for the card issuer to the network communications device over the air interface.

* * * * *